United States Patent
Chen et al.

(10) Patent No.: US 9,413,611 B2
(45) Date of Patent: Aug. 9, 2016

(54) GENERATING AND ENFORCING A HOLISTIC QUALITY OF SERVICE POLICY IN A NETWORK

(71) Applicant: Juniper Networks, Inc., Sunnyvale, CA (US)

(72) Inventors: Shaogang Chen, San Jose, CA (US); Vibhu Pratap, Sunnyvale, CA (US); Suganthi Srinivasan, Cupertino, CA (US); Fan Jiao, Cupertino, CA (US); Joanne Wang, Saratoga, CA (US); Dejan Mihajlovic, Los Gatos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 77 days.

(21) Appl. No.: 14/447,804

(22) Filed: Jul. 31, 2014

(65) Prior Publication Data

US 2014/0341027 A1    Nov. 20, 2014

Related U.S. Application Data

(62) Division of application No. 12/906,363, filed on Oct. 18, 2010, now Pat. No. 8,797,867.

(51) Int. Cl.
*H04L 12/24* (2006.01)
*H04L 12/26* (2006.01)

(52) U.S. Cl.
CPC ........ *H04L 41/0893* (2013.01); *H04L 41/5022* (2013.01); *H04L 43/0829* (2013.01); *H04L 43/0894* (2013.01); *H04L 43/16* (2013.01)

(58) Field of Classification Search
CPC ............ H04L 41/0893; H04L 41/5022; H04L 43/0829; H04L 43/0894; H04L 43/16
See application file for complete search history.

(56) References Cited

U.S. PATENT DOCUMENTS

| 5,991,272 | A  | 11/1999 | Key et al. |
| 8,004,972 | B2 | 8/2011  | Kekki |
| 8,797,867 | B1 | 8/2014  | Chen et al. |

(Continued)

OTHER PUBLICATIONS

S. Blake et al., "An Architecture for Differentiated Service", Network Working Group, RFC2475, Dec. 1998, 30 pages.

(Continued)

*Primary Examiner* — Christopher Grey
(74) *Attorney, Agent, or Firm* — Harrity & Harrity, LLP (57) ABSTRACT

A method may include receiving a request to establish a quality of service (QoS) policy that identifies a desired QoS associated with traffic being transported by a network; generating a QoS model based on the identified desired QoS, where the QoS model includes a class of service (CoS) and corresponding forwarding priorities associated with the traffic; retrieving a service level agreement (SLA), associated with a client device that is interconnected to a network node associated with the network, where the SLA includes a particular CoS and corresponding other forwarding priorities for packets associated with the client device; creating a QoS provisioning policy based on the QoS model and the SLA, where the creating includes mapping the CoS to the particular CoS or mapping the forwarding priorities to the other forwarding priorities; and transmitting, to the network node, the QoS provisioning policy that permits the network node to process the packets in a manner that complies with the QoS model or the SLA.

20 Claims, 8 Drawing Sheets

(56) References Cited

U.S. PATENT DOCUMENTS

| | | | |
|---|---|---|---|
| 2006/0209891 A1* | 9/2006 | Yamada | H04L 12/5695 370/468 |
| 2007/0280105 A1* | 12/2007 | Barkay | H04L 47/10 370/229 |
| 2010/0271940 A1 | 10/2010 | Padwekar | |
| 2011/0314145 A1* | 12/2011 | Raleigh | H04L 41/0893 709/224 |

OTHER PUBLICATIONS

K. Nichols et al., "Definition of the Differentiated Services Field (DS Field) in the IPv4 and IPv6 Headers", Network Working Group, RFC2474, Dec. 1998, 17 pages.

Cisco Systems, "DiffServ—The Scalable End-to-End QoS Model", Aug. 2005, 11 pages.

* cited by examiner

| CLASS OF SERVICE | PACKET LOSS PROBABILITY | FORWARDING PRIORITY MARKING | FORWARDING PRIORITY LABEL |
|---|---|---|---|
| RT | Low | 46 | Expedited Forwarding |
| RT | High | 46 | Expedited Forwarding |
| Data | Low | 10 | Assured Forwarding11 |
| Data | Medium | 12 | Assured Forwarding12 |
| Data | High | 14 | Assured Forwarding13 |
| BE | Low | 0 | Best Effort |
| BE | High | 0 | Best Effort |

Fig. 5B

| CLASS OF SERVICE | CODE POINT | PACKET LOSS PROBABILITY | FORWARDING PRIORITY MARKING |
|---|---|---|---|
| Silver RT | 1p7 | In Profile – Low / Out of Profile – Discard | 46 |
| Silver Data | 1p3 | In Profile – Low / Out of Profile – High | 10 / 14 |

GENERATING AND ENFORCING A HOLISTIC QUALITY OF SERVICE POLICY IN A NETWORK

RELATED APPLICATION

This application is a divisional of U.S. patent application Ser. No. 12/906,363, filed Oct. 18, 2010 (now U.S. Pat. No. 8,797,867), which is incorporated herein by reference.

BACKGROUND

In an increasingly networked world, more and more traffic, such as data, voice, and video, is transmitted over public and proprietary networks. The public or private networks process traffic based on the type of traffic (e.g., text, data, video, etc.), a particular quality of service (QoS) with respect to the traffic, the amount of congestion in the network, etc. The public and proprietary networks enforce QoS policies that enable the traffic to be classified and processed to achieve a particular QoS based on the classification. Unfortunately, the QoS policies are not always enforced consistently by the network devices within the public and proprietary networks.

SUMMARY

According to one aspect, a method may include receiving, by a network node of a group of network nodes and from a server device, a quality of service (QoS) provisioning policy, where the QoS provisioning policy may include a set of classes of service associated with traffic to be received from a client device, a set of code points associated with the traffic and corresponding to the set of classes of service, and a set of forwarding priority markings, obtained from a QoS policy that is enforced by the group of network nodes, that correspond to the set of classes of service. The method may also include receiving, by the network node and from the client device, packets associated with the traffic; classifying the packets, by the network node, as being of a class of service, of the set of classes of service, based on one of the set of code points, obtained from the packets, that corresponds to the class of service; marking the packets, by the network node, using a particular forwarding priority marking, of the set of forwarding priority markings, that corresponds to the class of service based on the QoS provisioning policy; and outputting, by the network node and to another network node of the group of network nodes, the marked packets, where the marked packets may permit the other network node to process the marked packets in a manner that conforms to the QoS policy.

According to another aspect, a network node may include a memory to store information associated with a quality of service (QoS) provisioning policy, where the information associated with the QoS provisioning policy may include a class of service associated with traffic to be received from a client device, a profile that includes set of packet loss probabilities, and a marking, obtained from a QoS policy, that is enforced by a network associated with the network node, where the marking may correspond to a forwarding priority associated with the class of service. The network device may also include a processor to receive, from the client device, packets associated with the traffic; classify the packets as being of the class of service, based on a code point identified from the packets, where the code point may indicate a desired forwarding priority; and measure a data rate associated with the packets. The processor may also identify a first packet loss probability, of the set of packet loss probabilities, when the data rate is greater than a maximum data rate threshold associated with the profile; drop the packets based on the first packet loss probability; identify a second packet loss probability, of the set of packet loss probabilities, when the data rate is less than the maximum data rate threshold; mark the packets with the marking, based on the second packet loss probability; and output the packets to another network node, associated with the network, based on the marking, where the markings may enable the other node to process the marked packets in a manner that conforms to the QoS provisioning policy.

According to yet another aspect, a server device-implemented method may include receiving, by the server device, a request to establish a network-wide quality of service (QoS) policy, where the request may include information that corresponds to a desired QoS associated with traffic being transported by the network; and generating, by the server device, a QoS model data structure based on all or a portion of the information that corresponds to the desired QoS associated with the traffic, where the QoS model data structure may include a class of service and a corresponding set of forwarding priorities associated with the traffic. The method may also include retrieving, by the server device, a service level agreement (SLA) associated with a client device that is interconnected to a network node of the group of network nodes, where the SLA may include a particular class of service and a corresponding set of other forwarding priorities for packets associated with the client device. The method may further include creating, by the server device, a QoS provisioning data structure based on the QoS model data structure and the SLA, where the creating may include mapping the class of service to the particular class of service or mapping the set of forwarding priorities to the set of other forwarding priorities; and transmitting, by the server device and to the network node, the QoS provisioning data structure that may permit the network node to process the packets, associated with the client device, in a manner that complies with the QoS model data structure or with the SLA.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements. Also, the following detailed description does not limit the invention.

Implementations described herein may include techniques for establishing and enforcing a holistic quality of service (QoS) policy within a network. A QoS application may establish a holistic QoS model that can be uniformly applied to and/or enforced by all or a portion of network devices in a network. The QoS model may be established by identifying the characteristics associated with the traffic expected to be handled by the network and designing a network-wide QoS model based on the characteristics of the expected traffic. The QoS application may generate the network-wide QoS model based on the design and may send the QoS model to network devices at the boundary of the network (e.g., to edge devices).

In another example implementation, the QoS application may use the QoS model to generate a QoS provisioning policy associated with traffic received from a client device with which the network communicates. The QoS provisioning policy may be based on a service level agreement (SLA) associated with the client device. The SLA, associated with the client device, may identify a manner in which the network is to process the traffic so as to ensure that the traffic is processed and/or transported over the network with a particular QoS.

In yet another example implementation, an edge device may enforce the QoS model by processing incoming traffic (e.g., received from the client device) based on the QoS provisioning policy. The edge device may identify a class of service and/or a corresponding packet loss probability associated with the incoming traffic (e.g., real-time traffic, data, best efforts traffic, etc.). The edge device may determine whether the incoming traffic conforms to a profile, defined by the SLA, based on a data rate and/or bandwidth associated with the identified class of service and/or packet loss probability. The edge device may drop and/or buffer the incoming traffic, and/or may mark the incoming traffic with a particular forwarding priority marking based on the QoS provisioning policy. The edge device may forward the incoming traffic to the network (e.g., based on the markings), via a core device, in a manner that permits the core device to process the incoming traffic according to the QoS provisioning policy (e.g., based on the markings).

In still another example implementation, the edge device may enforce the QoS model by processing outgoing traffic (e.g., received from a core device) based on the QoS provisioning policy. The edge device may identify a forwarding priority marking associated with the outgoing traffic (e.g., real-time traffic, data, best efforts traffic, etc.). The edge device may determine a forwarding class and/or a packet loss probability associated with the outgoing traffic based on the identified forwarding priority marking. The edge device may forward the outgoing traffic to a client device, based on the forwarding class and/or the packet loss probability and in a manner that permits the client device to process the traffic according to a QoS policy associated with the client device.

Enforcing the QoS model, based on the QoS provisioning policy, may ensure that network devices (e.g., edge devices and/or core devices) process the traffic in a manner that conforms to the QoS model and/or complies with the SLA.

Example System Overview

Figure 1:
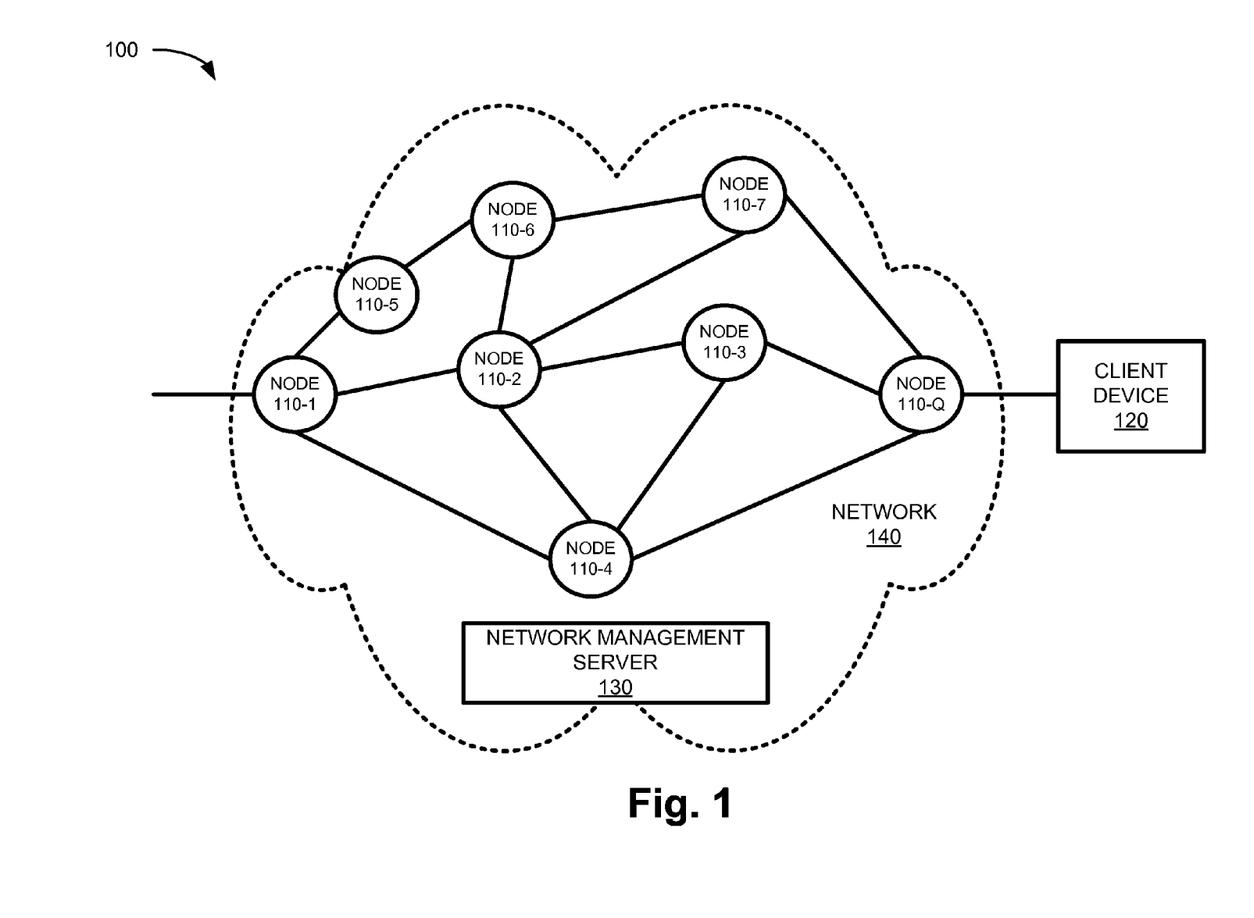
FIG. 1 is a diagram illustrating an example system.

FIG. 1 is a diagram illustrating an example system 100. As shown in FIG. 1, system 100 may include a group of network nodes 110-1, . . . , node 110-Q (where Q≥1) (hereinafter collectively referred to as "nodes 110" and individually as "node 110"), a client device 120, and a network management system 130 (hereinafter referred to as "NMS 130") that are interconnected by a network 140. FIG. 1 shows an example of devices that may be included in system 100. In other implementations, system 100 may include fewer devices, different devices, differently arranged devices, or additional devices than depicted in FIG. 1. In still other implementations, one or more devices of system 100 may perform one or more tasks described as being performed by one or more other devices of system 100.

Node 110 may include a network device that transmits data traffic. For example, node 110 may take the form of a routing device, a switching device, a multiplexing device, or a device that performs a combination of routing, switching, and/or multiplexing functions. In one implementation, node 110 may be a digital device. In another implementation, node 110 may be an optical device. In yet another implementation, node 110 may be a combination of a digital device and an optical device.

Node 110 may include an internal or external storage device and/or memory that stores information associated with node 110 operations. In one example, node 110 may store, in the storage device and/or memory, network topology information, routing tables and/or packet forwarding tables. In another example, node 110 may store, in the storage device and/or memory, information associated with a virtual local area network (VLAN) hosted by Node 110.

In one example, node 110 may act as an edge device and may generally function to connect client device 120 to network 140. In another example, node 110 may act as a core device and may function to transmit traffic between other nodes 110 within network 140. Node 110 may add (push) and/or remove (pop) information (e.g., headers, trailers, tags, etc.) from incoming and/or outgoing packets. In another implementation, nodes 110 may process traffic in a manner that enforces a QoS model associated with network 140. The QoS model may, in one example implementation, be based on a differentiated services (e.g., DiffServ) protocol based on the Internet Engineering Task Force's (IETF) Request For Comment (RFC) 2474, RFC 2475, and/or other RFCs associated with the DiffServ protocol.

Node 110 (e.g., node 110-Q) may receive traffic and may process the traffic based on a QoS provisioning policy associated with client device 120 from which the traffic was received. The processing may include classifying the packet in a particular class of service based on the type of traffic and/or a code point stored in a packet header. The processing may also include identifying a packet loss probability associated with the incoming traffic that corresponds to the particular class of service. Node 110 may determine a data rate, bandwidth utilization, and/or other information associated with the traffic. The processing may further include determining whether the traffic is within a profile as defined by an SLA, associated with client device 120, based on the classification, packet loss probability, data rate, and/or bandwidth. If the traffic is within the profile, node 110 may mark the traffic with a particular forwarding priority identified by an in-profile QoS provisioning policy (e.g., best effort forwarding, expedited forwarding, assured forwarding, etc.). If the traffic is not within the profile, node 110 may process the packet based on an out-of-profile QoS provisioning policy (e.g., which may include dropping the packet, remarking to a different forwarding priority than in-profile markings, etc.).

For example, if the forwarding priority calls for expedited forwarding, then node 110 may process the traffic with strict priority (e.g., by placing the traffic at the front of a queue) relative to other classes of service to minimize delay, jitter, etc. In another example, if the forwarding priority calls for assured forwarding, then node 110 may temporarily store the traffic in a queue based on the relative forwarding priority of other classes of traffic. In yet another example, if the forwarding priority calls for best effort forwarding, then node 110 may temporarily store the traffic in a queue behind other classes of traffic with higher forwarding priorities.

Client device 120 may generally include one or more devices designed to communicate with network 140. Client device 120 may include, for example, a mobile telephone, a smart phone, an electronic notepad, a laptop, a computer device, a set top box, a camera, a personal digital assistant (PDA), a landline telephone, a server device, etc. Client device 120 may establish communication sessions with network 140. The communication sessions may be used for text (e.g., email, instant messaging, voice (e.g., telephone calls), video, data, etc.

NMS 130 may include one or more server devices, or other types of computation or communication devices, that gather, process, search, store, and/or provide information in a manner similar to that described herein. For example, NMS 130 may host a QoS application that enables NMS 130 to establish a uniform and/or network-wide QoS policy (e.g., a QoS model) for network 140. For example, NMS 130 may monitor nodes 110 to obtain information associated with traffic that is being handled by network 140. NMS 130 may, in one example, monitor uplink interfaces associated with each node 110, of network 140, to identify information associated with the traffic such as types of traffic (e.g., voice, data, video, text, etc.), classes of service, bandwidth, data rates, forwarding priorities, packet loss probability (hereinafter referred to as "packet loss probability"), etc.

The QoS application may use information associated with the traffic to design a network-wide QoS model that may enables node 110 to enforce a network-wide QoS policy for the traffic that is transported via network 140.

The QoS application may generate a QoS model for network 140 (e.g., sometimes referred to as a "DiffServ domain") and may forward the QoS model to edge nodes 110 associated with network 140. In one example, the QoS application may generate a QoS model for a DiffServ domain that includes all or a portion of nodes 110 associated with network 140. In another example, the QoS application may generate one or more QoS models associated with one or more DiffServ domains of network 140.

NMS 130 may generate a QoS provisioning policy associated with client device 120 based on a SLA associated with client device 120 and the QoS model. For example, the QoS application may create a QoS provisioning policy associated with a user-network interface (UNI) via which node 110 sends traffic to and/or receives traffic from client device 120. The QoS application may create the QoS provisioning policy by mapping information associated with the traffic, traveling via the UNI, to the QoS model for network 140. In one example, the QoS application may map a class of service associated with incoming traffic to a class of service identified in the QoS model. In another example, the QoS application may map a forwarding priority (e.g., sometimes referred to as a "code point") associated with the traffic to a forwarding priority (e.g., forwarding priority marking) identified in the QoS model. In yet another example, the QoS application may map a packet loss probability (e.g., associated with a profile defined in the SLA) with a packet loss probability identified in the QoS model. The QoS application may forward the QoS provisioning policy to edge node 110 that enables edge node 110 to enforce the QoS provisioning policy on traffic being received from and/or sent to client device 120. via the UNI.

Network 140 may include one or more wired and/or wireless networks. For example, network 140 may include a cellular network, a public land mobile network (PLMN), a second generation (2G) network, a third generation (3G) network, a fourth generation (4G) network (e.g., a long term evolution (LTE) network), a fifth generation (5G) network, and/or another network. Additionally, or alternatively, network 140 may include a wide area network (WAN), a metropolitan network (MAN), a telephone network (e.g., the Public Switched Telephone Network (PSTN)), an ad hoc network, an intranet, the Internet, a fiber optic-based network (e.g., a FiOS network), and/or a combination of these or other types of networks.

Example Device Architecture

Figure 2:
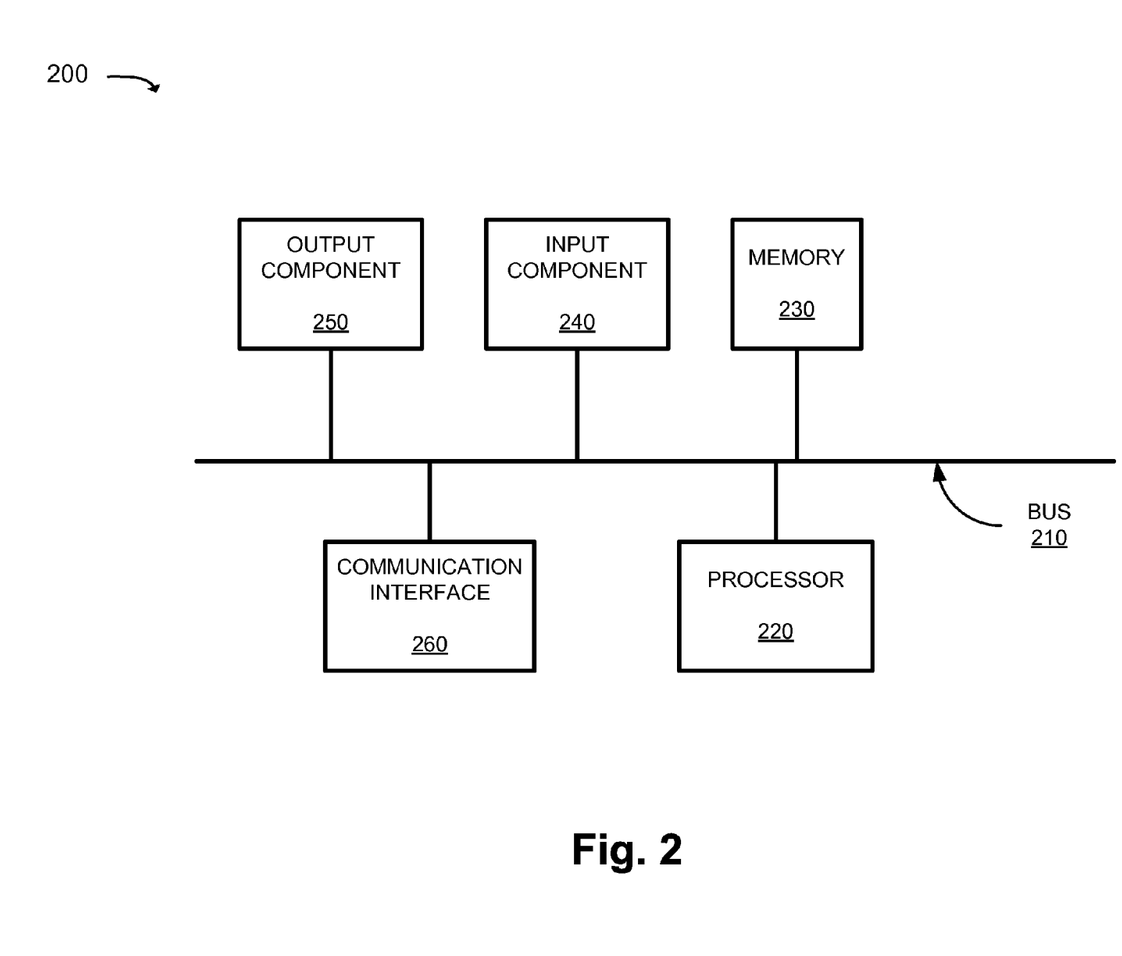
FIG. 2 is a diagram illustrating example components of a network device in the system shown in FIG. 1.

FIG. 2 is a diagram of example components of a device 200. Device 200 may correspond to one of nodes 110, client device 120, and/or NMS 130. Alternatively, client device 120 and/or NMS 130 may include multiple devices 200. As shown in FIG. 2, device 200 may include a bus 210, a processor 220, a memory 230, an input component 240, an output component 250, and a communication interface 260.

Although FIG. 2 shows example components of device 200, in other implementations, device 200 may include fewer components, additional components, different components, or differently arranged components than depicted in FIG. 2. Additionally, or alternatively, one or more components of device 200 may perform one or more tasks described as being performed by one or more other components of device 200.

Bus 210 may include a path that permits communication among the components of device 200. Processor 220 may include a processor, microprocessor, or processing logic that may interpret and execute instructions. Memory 230 may include any type of dynamic storage device that may store information and instructions, for execution by processor 220, and/or any type of non-volatile storage device that may store information for use by processor 220.

Input component 240 may include a mechanism that permits a user to input information to device 200, such as a keyboard, a keypad, a button, a switch, a microphone, a camera, a fingerprint reader, etc. Output component 250 may include a mechanism that outputs information to the user, such as a display, a speaker, one or more light emitting diodes (LEDs), a haptics-based device, etc. Communication interface 260 may include any transceiver-like mechanism that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 260 may include mechanisms for communicating with another device or system via a network, such as network 140.

As will be described in detail below, device 200 may perform certain operations relating to application registration, verification, and/or authorization. Device 200 may perform these operations in response to processor 220 executing software instructions contained in a computer-readable medium, such as memory 230. A computer-readable medium may be defined as a physical or logical memory device. A logical memory device may include memory space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Example Node Architecture

Figure 3:
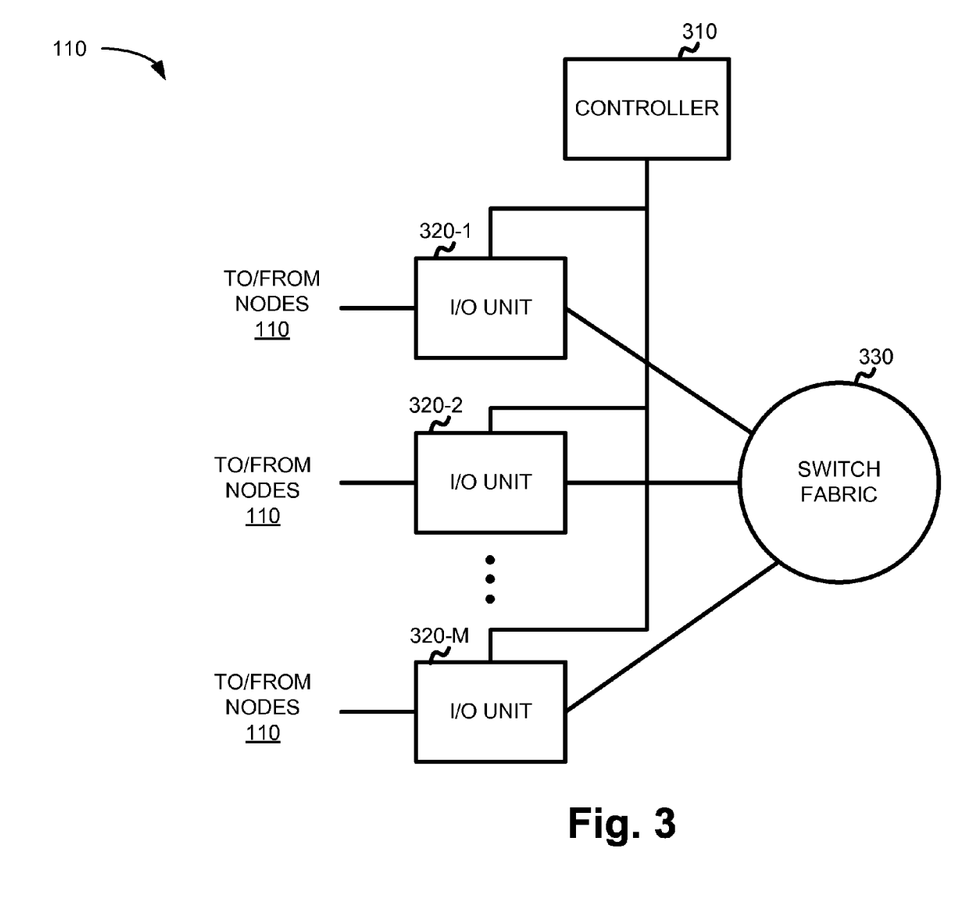
FIG. 3 is a diagram illustrating example components of a node within the system shown in FIG. 1.

FIG. 3 is a diagram illustrating example components of node 110. In this example implementation, node 110 may take the form of a router, although the systems and/or methods herein may be implemented in another type of network device. For example, node 110 may include another data transfer device, such as a gateway, a switch, a firewall, a network interface card (NIC), a hub, a bridge, a proxy server, an optical add-drop multiplexer (OADM), or some other type of device that processes and/or transfers traffic.

Node 110 may receive network traffic, as one or more packet stream(s), from physical links, may process the packet stream(s) to determine destination information, and may transmit the packet stream(s) out on links in accordance with the destination information. Node 110 may include a controller 310, a set of input/output (I/O) units 320-1, 320-2, ..., 320-M (where M≥1) (hereinafter referred to collectively as "I/O units 320" and individually as "I/O unit 320"), and a switch fabric 330.

Controller 310 may include a processor, a microprocessor, or some form of hardware logic (e.g., an application specific integrated circuit (ASIC) or a field programmable gate array (FPGA)). In one example implementation, controller 310 may include an Ethernet controller and/or another controller device. Controller 310 may perform high level management functions for node 110. For example, controller 310 may maintain the connectivity and manage information/data necessary for transferring packets by node 110. Controller 310 may create routing tables based on network topology information, create forwarding tables based on the routing tables, and communicate the forwarding tables to I/O units 320. I/O units 320 may use the forwarding tables to perform route lookup for incoming packets and perform the forwarding functions for node 110. Controller 310 may also perform other general control and monitoring functions for node 110.

I/O unit 320 may include a component or collection of components to receive packets, to process incoming and/or outgoing packets, and/or to transmit outgoing packets. For example, I/O unit 320 may include I/O ports, a packet forwarding component, an Ethernet interface and/or another type of interface, a central processing unit (CPU), and/or a memory device. I/O unit 320 may include a collection of ports that receive or transmit packets via physical links. I/O unit 320 may also include packet processing component(s), switch interface component(s), Internet processor component(s), memory device(s), etc.

Each of I/O units 320 may be connected to controller 310 and switch fabric 330. I/O units 320 may receive packet data on physical links connected to a network (e.g., network 150). Each physical link could be one of many types of transport media, such as an optical fiber or an Ethernet cable.

I/O units 320 may process incoming packet data prior to transmitting the data to another I/O unit 320 or the network. I/O units 320 may perform route lookups for the data using the forwarding table from controller 310 to determine destination information. If the destination indicates that the data should be sent out on a physical link, connected to I/O unit 320, then I/O unit 320 may prepare the data for transmission by, for example, adding any necessary headers and/or modifying existing headers, and/or transmitting the data from the port associated with the physical link. If the destination indicates that the data should be sent to another I/O unit 320 via switch fabric 330, then I/O unit 320 may, if necessary, prepare the data for transmission to the other I/O unit 320 and/or may send the data to the other I/O unit 320 via switch fabric 330.

Switch fabric 330 may include one or multiple switching planes to facilitate communication among I/O units 320 and/or controller 310. In one implementation, each of the switching planes may include a single-stage switch or a multi-stage switch of crossbar elements. Switch fabric 330 may also, or alternatively, include processors, memories, and/or paths that permit communication among I/O units 320 and/or controller 310.

Although, FIG. 3 illustrates example components of node 110, in other implementations, node 110 may include additional components, fewer components, different components, or differently arranged components than those illustrated in FIG. 3 and described herein. Additionally, or alternatively, one or more operations described as being performed by a particular component of node 110 may be performed by one or more other components, in addition to or instead of the particular component of node 110.

Figure 4:
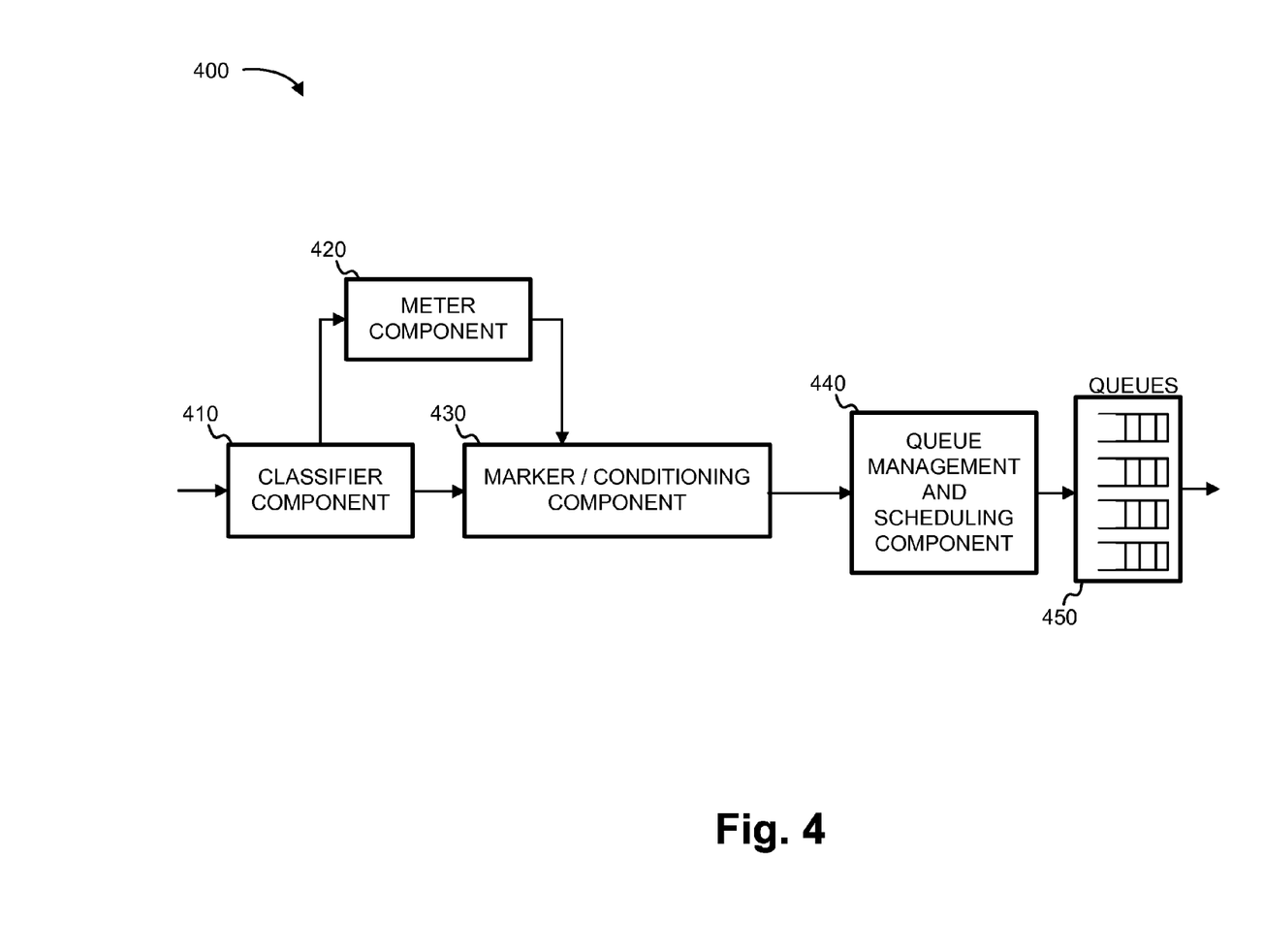
FIG. 4 is a diagram illustrating example functional components in the node of FIG. 3.

FIG. 4 is a diagram illustrating an example of functional components 400 of node 110. Functional components 400 may particularly include components to perform operations to enforce a QoS model, a QoS provisioning policy, and/or terms of a SLA and/or traffic contract. The functional components illustrated in FIG. 4 may be implemented, for example, by one or more of the components of node 110 illustrated in FIGS. 2 and/or 3. Functional components 400 may include a classifier component 410, a meter component 420, a marker/conditioning component 430, a queue management and scheduling component 440, and queues 450.

Classifier component 410 may separate incoming packets (e.g., from client device 120) into different traffic classes. The class separation may be based on information in the header of the packet to place each data packet into a limited number of traffic classes. Each traffic class can be managed differently, based on an associated packet loss probability, ensuring preferential treatment for higher-priority traffic on the network. For example, classifier component 410 may classify incoming traffic as real-time (RT) traffic (e.g., streaming media, voice, etc.), data traffic (e.g., file transfers, email messages, etc.), best effort (BE) traffic (e.g., web traffic, etc.).

In another example, classifier component 410 may identify the manner in which outgoing traffic is to be processed based on a marking stored in the header. The marking may correspond to a forwarding class and/or packet loss probability with which the outgoing traffic is to be processed when sending the traffic (e.g., to client device 120). Classifier component 410 may send an indication regarding the marking associated with the outgoing traffic to marker/conditioning component 430 and/or queue management and scheduling component 440.

Meter component 420 may measure the rate (e.g., the instantaneous bandwidth and/or bit rate) of incoming traffic. Traffic may be measured on a per-connection or per-traffic class basis. The output of meter component 420 may be input to marker/conditioning component 430 and/or to queue management and scheduling component 440. The traffic measurements taken by meter component 420 may be used to determine whether a connection conforms to or exceeds the SLA and/or QoS provisioning policy.

Marker/conditioning component 430 may process traffic based on a QoS provisioning policy associated with the traffic. For example, marker/conditioning component 430 may monitor traffic, received from client device 120 (e.g., via a UNI), for compliance with the QoS provisioning policy and/or the SLA associated with client device 120. Marker/conditioning component 430 may receive, from classifier component 410, an indication that identifies a class of service associated with the traffic and may determine a packet loss probability that corresponds to the class of service based on the QoS provisioning policy. Marker/conditioning component 430 may determine whether the incoming traffic complies with one or more profiles, associated with the packet loss probability identified in the QoS provisioning policy (and/or the SLA). For example, marker/conditioning component 430 may determine whether a data rate and/or bandwidth (e.g., received from metering component 420) exceeds a threshold associated with the packet loss probability based on the QoS provisioning policy. Marker/conditioning component 430 may process the out-of-profile traffic based on a QoS provisioning policy associated with client device 120. In another example, marker/conditioning component 430 may determine that a data rate and/or bandwidth for the traffic does not exceed the threshold and may process the in-profile traffic based on the QoS provisioning policy.

Marker/conditioning component 430 may enforce the QoS provisioning policy. For example, marker/conditioning component 430 may drop packets associated with out-of-profile traffic based on the QoS provisioning policy. In another example, marker/conditioning component 430 may mark the packets according to a lower forwarding priority (e.g., by reducing the forwarding priority). In yet another example, marker/conditioning component 430 may mark the packets associated with in-profile traffic which may correspond to a higher forwarding priority.

Queue management and scheduling component 440 may manage the assignment of packets to various ones of queues 450. Packets may be placed in queues 450 based on, for example, the forwarding class of the packet. Queue management and scheduling component 440 may determine the bandwidth allotted to each one of queues 450.

Queues 450 may include, for example, a number of first-in-first-out (FIFO) queues that buffer packets before transmission from node 110. Each queue in queues 450 may be used to buffer the packets for a particular traffic class or stream. Different queues may be allotted different transmission bandwidths by queue management and scheduling component 440. In this manner, different classes of packets may be treated with different priorities.

Example QoS Policies

Figure 5A:
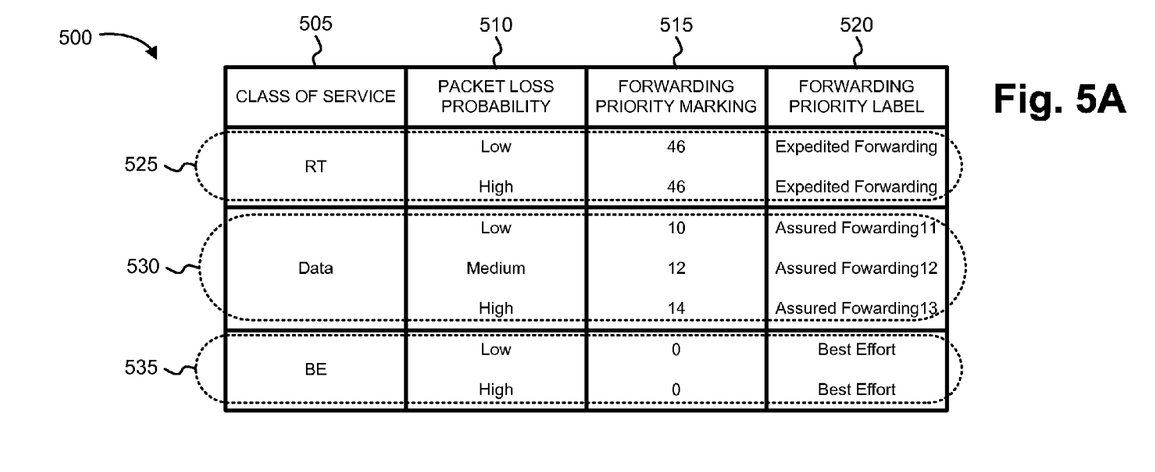
FIG. 5A is a diagram illustrating an example quality of service (QoS) model associated with the network of FIG. 1.

FIG. 5A is a diagram illustrating an example QoS model 500. QoS model 500 may be generated (e.g., by NMS 130) and/or designed in a manner that establishes a desired QoS associated with traffic to be transported within network 140.

As illustrated in FIG. 5A, QoS model 500 may include a collection of fields, such as a class of service field 505, a packet loss probability field 510, a forwarding priority marking field 515, and a forwarding priority label field 520 and/or other fields not shown in FIG. 5A (e.g., a transmit rate, a queue priority, a buffer size, etc.). QoS model 500 includes fields 505-520 for explanatory purposes. In practice, QoS model 500 may include additional fields, fewer fields, different fields, and/or differently arranged fields than are described with respect to QoS model 500.

Class of service field 505 may store an identifier for a particular class of service associated with traffic to be received by node 110. For example, QoS model 500 may be designed in a manner that enables node 110 to classify traffic, received by node 110, into the particular class of service based on the identifier stored in class of service field 505. Packet loss probability field 510 may store an indication of a probability that packets, associated with the particular class of service, will be dropped or lost in the event that congestion occurs.

Forwarding priority marking field 515 may store a value that corresponds to a forwarding priority associated with the particular class of service associated with the received traffic and/or a particular packet loss probability associated with the received traffic. Forwarding priority label field 520 may store an identifier that corresponds to the value stored in forwarding priority marking field 515. For example, the QoS application may identify a forwarding priority based on the particular class of service and/or a packet loss probability associated with the received data. The QoS application may store a value (e.g., a DSCP value associated with a DiffServ protocol) and/or an identifier (e.g., a label, a name, etc.), that corresponds to the forwarding priority, in forwarding priority marking field 515. Node 110 may mark packets with the value stored in forwarding priority marking field 515 and/or forwarding priority label field 520.

QoS model 500 may be designed in a manner that enables node 110 to process traffic according to a particular priority based on a particular class of service and/or a packet loss probability associated with the particular class of traffic. For example, traffic classified as real-time (RT) traffic, associated with a particular packet loss probability (e.g., a low threshold, a high threshold, etc.), may be marked and/or forwarded, by node 110, based on QoS model 500 (e.g., as shown by ellipse 525). Node 110 may, for example, mark the packets based on a forwarding priority marking (e.g., a DSCP marking such as 46 or binary 101110) and/or forwarding priority label (e.g., expedited forwarding) that corresponds to the particular class of service and/or packet loss probability based on QoS model 500 (e.g., as shown by ellipse 525). Node 110 may process the marked packets based on a forwarding priority that corresponds to the marking.

In another example, traffic classified as data traffic (e.g., Data), associated with a particular packet loss probability (e.g., a low, medium, or high threshold, etc.), may be marked and/or processed, by node 110, based QoS model 500 (e.g., as shown by ellipse 530). Node 110 may, for example, mark the packets based on a forwarding priority marking (e.g., a DSCP marking such as 10, 12, 14 or binary 001010, 001100, 001110, respectively) and/or forwarding priority label (e.g., assured forwarding 11, 12, 13, respectively) identified in QoS model 500 (e.g., as shown by ellipse 530). In yet another example, traffic classified as best efforts (BE) traffic, associated with a particular packet loss probability (e.g., a low threshold, a high threshold, etc.), may be marked and/or processed, by node 110, based QoS model 500 (e.g., as shown by ellipse 535). Node 110 may, for example, mark the packets based on a forwarding priority marking (e.g., a DSCP marking, such as 0 or binary 000000) and/or forwarding priority label (e.g., best efforts forwarding) identified in QoS model 500 (e.g., as shown by ellipse 535).

Figure 5B:
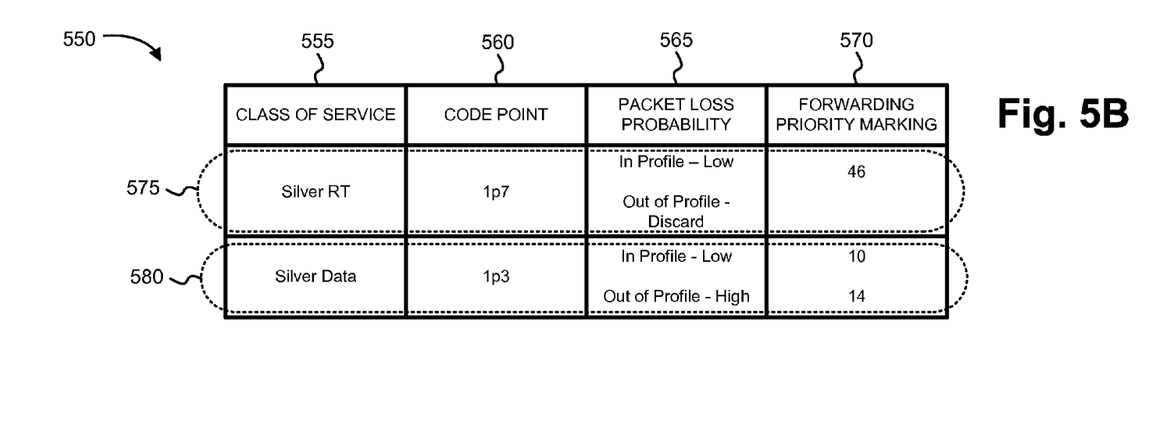
FIG. 5B is a diagram illustrating an example QoS provisioning policy associated with the network of FIG. 1.

FIG. 5B is a diagram illustrating an example QoS provisioning policy 550. QoS provisioning policy 550 may be generated, by NMS 130, based on QoS model 500 and terms corresponding to an SLA associated with client device 120. More particularly, QoS provisioning policy 550 may store information that enables node 110 to enforce QoS model 500 on traffic received from and/or sent to client device 120 in a manner that ensures that the traffic complies with a network-wide QoS policy and/or terms of the SLA associated with client device 120.

As illustrated in FIG. 5B, QoS provisioning policy 550 may include a collection of fields, such as a class of service field 555, a code point field 560, a packet loss probability field 565, and a forwarding priority marking field 570. QoS provisioning policy 550 includes fields 555-570 for explanatory purposes. In practice, QoS provisioning policy 550 may include additional fields, fewer fields, different fields, and/or differently arranged fields than are described with respect to QoS provisioning policy 550.

Class of service field 555 may store an identifier for a particular class of service, identified in the SLA, associated with traffic received from and/or sent to client device 120. Code point field 560 may store a value (e.g., a code point as identified in the SLA) associated with the particular class of service associated with the traffic. Packet loss probability field 565 may store an indication of a probability that packets, associated with the particular class of service, will be dropped (e.g., based on whether the traffic is in-profile or out-of-profile as defined by the SLA). Forwarding priority marking field 570 may, in a manner similar to that described above (e.g., with respect to forwarding priority marking field 515 of FIG. 5A), store a value, such as DSCP value, that corresponds to a forwarding priority associated with the traffic.

QoS provisioning policy 550 may be used by edge node 110 to enforce a network-wide QoS model (e.g., QoS model 500 of FIG. 5A) in a manner that conforms to the SLA associated with client device 120. Additionally, or alternatively, edge node 110 may use QoS provisioning policy 550 to mark packets (e.g., with a forwarding priority marking) to be transported over the network (e.g., network 140), via core nodes 110, that permits each core node 110 to enforce the QoS model in the core of the network. Edge node 110 may use QoS provisioning policy 550 to remark packets (e.g., with a code point value) that are received from the network (e.g., network 140 and to be transported to client device 120 (e.g., via the UNI) that permits client device 120 to enforce a QoS policy associated with client device 120.

For example, node 110 may receive traffic from client device 120 via the UNI and may determine a particular class of service (e.g., a Silver RT) and/or a particular packet loss probability (e.g., in profile—low, when the traffic bandwidth is below a threshold) (e.g., as shown by ellipse 575). Based on the determination of the particular class of service and/or packet loss probability, node 110 may mark the packets (e.g., with forwarding priority marking 46) based on QoS provisioning policy 550, which may enable the traffic to be processed, by nodes 110 within network 140, with expedited forwarding in compliance with QoS model 500 and the SLA. In another example, node 110 may receive traffic from core node 110 that includes a particular forwarding priority marking (e.g., 14) (e.g., as shown by ellipse 580). Node 110 may, based on the forwarding priority marking, remark the packets with a code point (e.g., 1p3 that corresponds to the forward priority marking) and/or transmit the traffic to client device 120 based on a class of service (e.g., Silver Data) and/or a packet loss probability (e.g., Out of Profil—High) that corresponds to the forwarding priority marking (e.g., as shown by ellipse 580).

Example Processes

Figure 6:
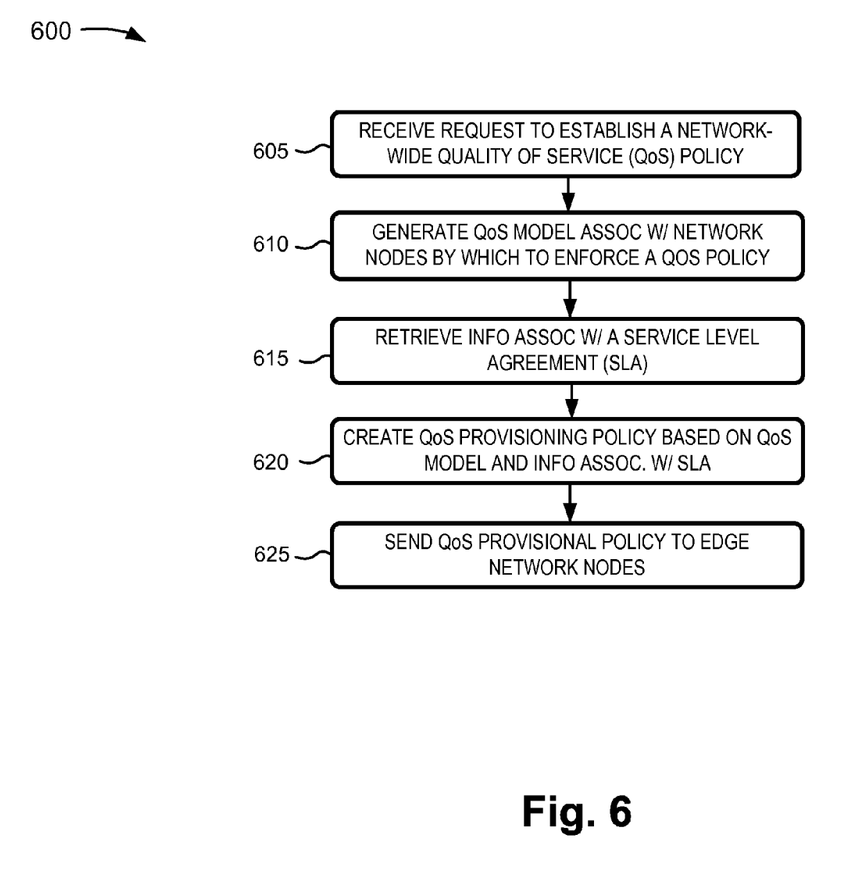
FIG. 6 is a flow chart illustrating an example process for establishing a network-wide QoS policy associated with the network of FIG. 1.

FIG. 6 is a flow chart illustrating an example process 600 for establishing a network-wide QoS policy associated with network 140. In one example implementation, process 600 may be performed by NMS 130. In another example implementation, some or all of process 600 may be performed by another device or group of devices including or excluding NMS 130.

As shown in FIG. 6, process 600 may include receiving a request to establish a network-wide QoS policy (block 605). For example, a network administrator may desire to establish a network-wide QoS policy that can be uniformly applied to all or a portion of nodes 110 within a network (e.g., network 140). The network administrator may send a request to NMS 130 to establish the QoS policy and NMS 130 may receive the request. The request may include information associated with nodes 110 on which the QoS policy is to be established.

As also shown in FIG. 6, process 600 may include generating a QoS model associated with nodes 110 by which to enforce a QoS policy (block 610). For example, the QoS application may cause NMS 130 to monitor traffic being processed by nodes 110 identified in the request. More particularly, the traffic may be monitored based on the uplink interfaces associated with nodes 110, to identify characteristics associated with the traffic. The characteristics of the traffic may be used by NMS 130 and/or a network administrator to design a QoS model (e.g., QoS model 500 of FIG. 5A) for network 140 that can be used to create and/or enforce a network-wide QoS policy.

In another example implementation, the QoS model may be generated based on information identified by the network administrator. For example, the network administrator may specify desired classes of service and/or corresponding packet loss probabilities to be included in the QoS model. In another example, the network administrator may specify the forward priority marking and/or label that corresponds to the desired classes of service. The NMS 130 may generate the QoS model based on the information identified by the network administrator. In yet another example, the network administrator may specify layer 2 information (e.g., information associated with a data link layer responsible for data transfer within a network) to be included in the QoS model. In this example, the network administrator may specify data rate thresholds, bandwidth thresholds, queue priorities, buffer sizes, etc. associated with the desired classes of service to be included in the QoS model.

In yet another example implementation, NMS 130 may retrieve the QoS model, designed by the network administrator at a prior point in time, from a memory associated with NMS 130.

As yet further shown in FIG. 6, process 600 may include retrieving information associated with a SLA (block 615) and generating a QoS provisioning policy based on a QoS model and/or the information associated with the SLA (block 620). For example, the QoS application may retrieve information associated with a SLA associated with edge node 110 that communicates with client device 120. The information associated with the SLA may include a desired manner and/or priority in which network 140 is to process and/or transport traffic received from and/or sent to client device 120. For example, the information associated with the SLA may identify a profile associated with a class of service to be provided by the network. In one example, the SLA may identify that a Silver RT class of service is to receive expedited forwarding and/or a low packet loss probability (e.g., less than a threshold) when the RT traffic is within profile (e.g., has a data rate that is less than a data rate threshold). In another example, the SLA may specify that packets, corresponding to traffic with the Silver RT class of service, are to be dropped when the RT traffic is out of profile (e.g., has a data rate that is greater than the data rate threshold).

The QoS application may map the information associated with the SLA to information associated with a QoS model (e.g., QoS model 500 of FIG. 5A) in order to create a QoS provisioning policy. The QoS provisioning policy may govern the manner in which traffic sent to and/or received from client device 120 (via a UNI) is processed, by edge node 110 (e.g., node 110-Q), to enforce a network-wide QoS policy (e.g., specified by the QoS model). For example, as shown by QoS provisioning policy 550 (FIG. 5B), the QoS application may store a class of service (e.g., Silver RT), a particular code point (e.g., 1p7), and/or an in-profile packet loss probability (e.g., In Profile—Low), obtained from the SLA, in QoS provisioning policy 550 (e.g., as shown by ellipse 575 of FIG. 5B).

Additionally, or alternatively, the QoS application may determine that the information associated with the SLA corresponds to (e.g., maps to) a class of service (e.g., RT), a packet loss probability (e.g., Low), a forwarding priority marking (e.g., a DSCP value, such as 46 or 101110 in binary), and/or a forwarding priority label (e.g., expedited forwarding) stored in QoS model 500 (e.g., as shown by ellipse 525 of FIG. 5A). Based on the determination, the QoS application may store the forwarding priority marking (e.g., 46) in QoS provisioning policy 550 (e.g., as shown by ellipse 575 of FIG. 5B).

In other example, the QoS application may store the class of service (e.g., Silver RT), the particular code point (e.g., 1p7), and/or an out-of-profile packet loss probability (e.g., Out of Profile—Discard), obtained from the SLA, in QoS provisioning policy 550 (e.g., as shown by ellipse 575). Additionally, or alternatively, the QoS application may determine that the information associated with the SLA maps to the class of service (e.g., RT), a packet loss probability (e.g., high) (e.g., as shown by ellipse 525 of FIG. 5A). However, because the SLA indicates that out of profile packets are to be discarded (e.g., dropped), the QoS application may not store a forwarding priority marking in QoS provisioning policy 550 (e.g., as shown by ellipse 575).

In yet another example, the QoS application may map other information associated with the SLA to the QoS model in order to create the QoS provisioning policy. The QoS application may, for example, map a class of service (e.g., Silver Data) associated with a particular code point (e.g., 1p3), and/or an in-profile packet loss probability (e.g., In Profile—Low) obtained from the SLA with a corresponding class of service (e.g., Data) associated with a packet loss probability (e.g., Low), a forwarding priority marking (e.g., 10), and/or a forwarding priority label (e.g., assured forwarding 11) (e.g., as shown by ellipse 530 of FIG. 5A).

In still another example, the QoS application may map the class of service (e.g., Silver Data) associated with a particular code point (e.g., 1p3), and/or an out-of-profile packet loss probability (e.g., Out of Profile—High) obtained from the SLA with the corresponding class of service (e.g., Data) associated with a packet loss probability (e.g., High), a forwarding priority marking (e.g., of 14), and/or a forwarding priority label (e.g., assured forwarding 13) (e.g., as shown by ellipse 530 of FIG. 5A). Based on the mapping, the QoS application may store the information obtained from the SLA with the information obtained from the QoS model in QoS provisioning policy 500 (e.g., as shown by ellipse 580 of FIG. 5B).

In another example implementation, an SLA and/or QoS provisioning policy may include other information than that described above, such as information associated with layer 2 of a network (e.g., a data link layer responsible for data transfer within network 140). For example, the QoS application may generate a layer 2 QoS provisioning policy (e.g., based on a layer 2 QoS model and/or layer 2 information included in a SLA) that may include data rate thresholds, bandwidth thresholds, queue priorities, buffer sizes, etc. associated with each class of service identified in the SLA and/or as identified from traffic traveling via a UNI.

Returning to FIG. 6, process 600 may include sending information associated with the QoS provisioning policy to edge nodes 110 (block 625). For example, NMS 130 may send the QoS provisioning policy to node 110 that may enable node 110 to enforce the QoS provisioning policy when sending traffic to and/or receiving traffic from client device 120. Enforcing the QoS provisioning policy may ensure that traffic received from or sent to client device 120 is processed in a manner that conforms to a network-wide QoS policy (e.g., QoS model 500 of FIG. 5B) and/or complies with the SLA associated with client device 120. NMS 130 may generate other QoS provisioning policies for other nodes 110, associated with network 140, that communicate with other client devices 120.

Figure 7:
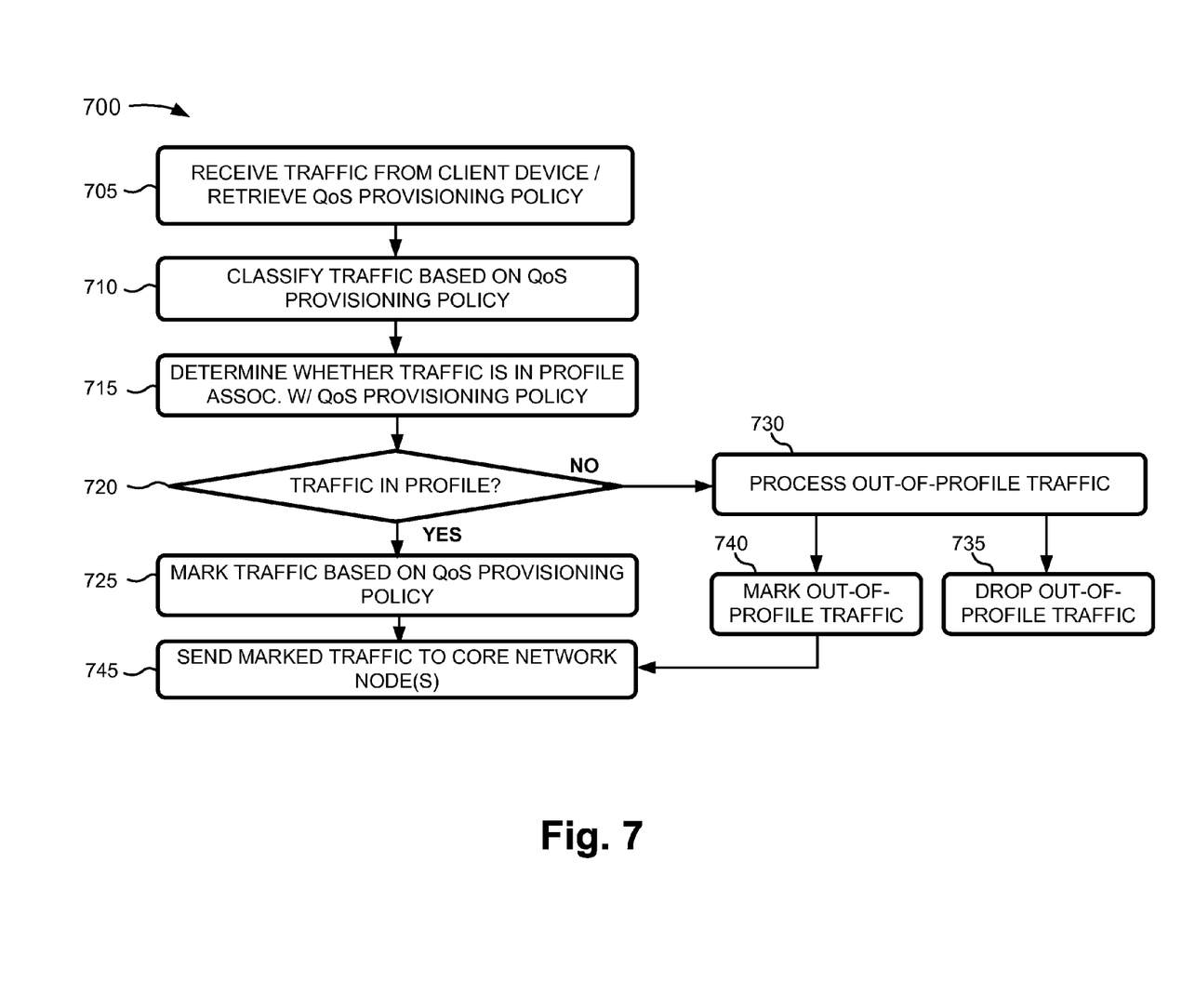
FIG. 7 is a flow chart illustrating an example process for using a QoS provisioning policy to process incoming traffic.

FIG. 7 is a flow chart illustrating an example process 700 for using a QoS provisioning policy to process incoming traffic. In one example implementation, process 700 may be performed by node 110. In another example implementation, some or all of process 700 may be performed by another device or group of devices including or excluding node 110.

As shown in FIG. 7, process 700 may include receiving traffic from client device 120 and retrieving a QoS provisioning policy (block 705). For example, edge node 110 (e.g., node 110-Q) may receive traffic from client device 120 via a UNI and edge node 110 may retrieve a QoS provisioning policy (e.g., QoS provisioning policy 550 of FIG. 5B), associated with the traffic, from a memory associated with edge node 110.

As also shown by FIG. 7, process 700 may include classifying traffic based on a QoS provisioning policy (block 710). For example, edge node 110 may determine the class of service and/or a packet loss probability of the received traffic based on a code point stored in a packet header of the packets associated with the received traffic. In one example, edge node 110 may use QoS provisioning policy 550 (FIG. 5B) to classify the received traffic (e.g., as Silver RT traffic that corresponds to streaming media, voice, etc.) based on a corresponding code point (e.g., 1p7).

As further shown in FIG. 7, process 700 may include determining whether traffic is in profile associated with a QoS provisioning policy (block 715). For example, edge node 110 may measure the data rate (e.g., bit rate) and/or bandwidth associated with the class of traffic to determine whether the traffic is in profile or out of profile, associated with the packet loss probability, as specified by the QoS provisioning policy. For example, edge node 110 may compare the measured data rate to a data rate threshold associated with the packet loss probability (e.g., corresponding to the Silver RT class of service), identified in the QoS provisioning policy, to determine whether the traffic is in profile or out of profile.

As yet further shown in FIG. 7, if the traffic is in profile (block 720—YES), then process 700 may include marking the traffic based on the QoS provisioning policy (block 725). For example, if edge node 110 determines that the measured data rate is less than the data rate threshold identified in the QoS provisioning policy, then edge node 110 may determine that the traffic is in profile. Based on the determination, edge node 110 may mark in-profile packets, associated with the traffic, with a forwarding priority marking (e.g., 46 or expedited forwarding) that corresponds to the class of service (e.g., RT) that is in-profile based on the QoS provisioning policy (e.g., QoS provisioning policy 550 of FIG. 5B). The forwarding priority marking may enable core nodes 110 (e.g., node 110-3) to enforce the QoS provisioning policy in a manner that conforms to the QoS model and/or the SLA.

As still further shown in FIG. 7, if the traffic is not in profile (block 720—NO), then process 700 may include processing out-of-profile traffic (block 730) by dropping the out-of-profile traffic (block 735) or by marking the out-of-profile traffic (block 740). For example, if edge node 110 determines that the measured data rate is greater than the data rate threshold identified in the QoS provisioning policy, then edge node 110 may determine that the traffic is out of profile. Based on the determination, edge node 110 may process out-of-profile packets, associated with the traffic, in conformance with the QoS provisioning policy, which may include dropping the packets and/or marking packets with a different forwarding priority (e.g., usually lower priority than in-profile packets). For example, if the QoS provisioning policy indicates that the out-of-profile packets are to be discarded, then edge node 110 may drop the out-of-profile packets associated with the traffic. If, however, the QoS provisioning policy indicates that the out-of-profile packets are to be marked with a forwarding priority, then edge node 110 may mark the out-of-order packets (e.g., with a forwarding priority marking) based on the QoS provisioning policy.

As shown in FIG. 7, process 700 may include sending marked traffic to core node(s) 110 (block 745). For example, edge node 110 may process the traffic based on the forwarding priority markings (e.g., the DSCP marking) If the marking calls for expedited forwarding, then edge node 110 may process the traffic in a manner that includes strict priority (e.g., by storing the traffic at the front of queues 450 of FIG. 4) over other traffic classes to minimize delay, jitter, etc. In another example, if the forwarding priority marking calls for assured forwarding, then edge node 110 may temporarily store the traffic in queues 450 based on the relative forwarding priority of other classes of traffic. In yet another example, if the forwarding priority calls for best effort forwarding, then edge node 110 may temporarily store the traffic in queues 450 behind other classes of traffic with higher forwarding priorities.

Edge node 110 may output the traffic received from client device 120 to another node 110 (e.g., based on a look up operation to determine a next hop) within network 140. The other node 110 may be a core node 110 within network 140. The traffic may include in-profile packets and/or out-of profile packets that have been marked with a packet forwarding marking (e.g., a DSCP marking) based on the QoS provisioning policy. Core node 110 may receive the traffic and/or may enforce the QoS provisioning policy in the core of network 140 based on the marking.

Figure 8:
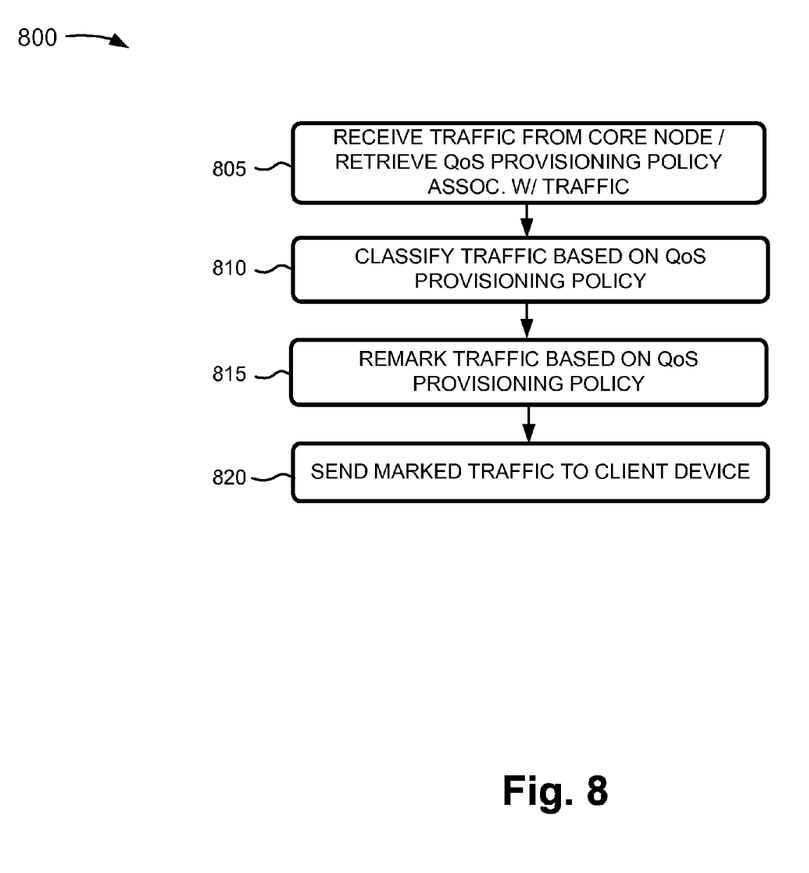
FIG. 8 is a flow chart illustrating an example process for using a QoS provisioning policy to process outgoing traffic.

FIG. 8 is a flow chart illustrating an example process 800 for using a QoS provisioning policy to process outgoing traffic. In one example implementation, process 800 may be performed by node 110. In another example implementation, some or all of process 800 may be performed by another device or group of devices including or excluding node 110.

As shown in FIG. 8, process 800 may include receiving traffic from core node 110 and retrieving a QoS provisioning policy associated with the traffic (block 805). For example, edge node 110 (e.g., node 110-Q) may receive traffic destined for client device 120 from core node 110 (e.g., node 110-3) and edge node 110 may retrieve a QoS provisioning policy (e.g., QoS provisioning policy 550 of FIG. 5B), associated with the traffic, from a memory associated with edge node 110.

As also shown by FIG. 8, process 800 may include classifying traffic based on a QoS provisioning policy (block 810) and remarking the traffic based on the QoS provisioning policy (block 815). For example, edge node 110 may identify forwarding priority markings (e.g., DSCP markings) included in the packet header of packets associated with the traffic. In one example, edge node 110 may determine that the packet headers include particular forwarding priority markings (e.g., a DSCP marking of 10 or 001010 in binary). Based on the determination, edge node 110 may use the QoS provisioning policy (e.g., ellipse 580, associated with QoS provisioning policy 550, of FIG. 5B) to identify a class of service (e.g., Silver Data) that corresponds to the markings Based on the identified class of service, edge node 110 may remark the packets with a code point (e.g., 1p3) that corresponds to the identified class of service. When remarking the packets, edge node 110 may store the code point in the field corresponding to the DSCP marking within the packet header.

As further shown in FIG. 8, process 800 may include sending the marked traffic to client device 120 (block 820). For example, edge node 110 may send the traffic, that includes the remarked packets, to client device 120 via a UNI. The remarked packets may permit client device 120 to receive the packets and/or to enforce a QoS policy, associated with client device 120, based on the code point corresponding to the class of service associated with the traffic.

CONCLUSION

A QoS application, as described above, may establish a network-wide QoS policy when the QoS application generates a QoS model for a network. The QoS application may generate the QoS model by storing information associated with a desired QoS, as specified by a network administrator, in the QoS model. The QoS application may create a QoS provisioning policy, associated with traffic that is sent to and/or received from a client device via a UNI. The QoS provisioning policy may be based on the QoS model and/or information associated with a SLA corresponding to the client device. The QoS application may map profiles, specified by the SLA, to the QoS model to create a QoS provisioning policy for traffic traveling via the UNI. A network node, at a boundary of the network, may use the QoS provisioning policy to enforce a network-wide QoS policy (e.g., based on the QoS model) in a manner that complies with the SLA. The network node may process traffic with a particular forwarding priority, based on the QoS provisioning policy, that enables network nodes, in the core of the network, to process the traffic in a manner that conforms to the network-wide QoS policy and/or complies with the SLA.

The foregoing description provides illustration and description, but is not intended to be exhaustive or to limit the invention to the precise form disclosed. Modifications and variations are possible in light of the above teachings or may be acquired from practice of the invention.

While a series of blocks has been described with regard to FIGS. 5-7, the order of the blocks may be modified in other embodiments. Further, non-dependent blocks may be performed in parallel.

It will be apparent that embodiments, as described herein, may be implemented in many different forms of software, firmware, and hardware in the embodiments illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions, described above, may be implemented as a component or logic that performs one or more functions. A component or logic, as used herein, may include hardware, such as a processor, ASIC, or FPGA, or a combination of hardware and software (e.g., a processor executing software).

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    receiving, by a server device, a request to establish a network-wide quality of service (QoS) policy,
        the request including information that corresponds to a desired QoS associated with traffic being transported by a network;
    generating, by the server device, a QoS model data structure based on all or a portion of the information that corresponds to the desired QoS associated with the traffic,
        the QoS model data structure identifying a class of service and a corresponding one or more forwarding priorities associated with the traffic;
    retrieving, by the server device, a service level agreement (SLA), associated with a client device that is interconnected to a network node of a plurality of network nodes,
        the SLA identifying a particular class of service and a corresponding one or more other forwarding priorities for packets associated with the client device, and
        the SLA identifying a profile, associated with the particular class of service, that corresponds to one or more of:
            a packet loss probability, or
            a maximum data rate;
    creating, by the server device, a QoS provisioning data structure based on the QoS model data structure and the SLA,
        creating the QoS provisioning data structure including:
            mapping a forwarding priority, of the one or more other forwarding priorities, to the packet loss probability that causes the network node to process the packets based on the forwarding priority when a data rate of the packets is less than the maximum data rate; and
    transmitting, by the server device and to the network node, the QoS provisioning data structure that permits the network node to process the packets, associated with the client device, in a manner that complies with the QoS model data structure or with the SLA.

2. The method of claim 1, where creating the QoS provisioning data structure further includes:
    storing, in the QoS provisioning data structure, information identifying the particular class of service, the one or more other forwarding priorities, and the one or more forwarding priorities.

3. The method of claim 1, where generating the QoS model data structure includes:
    determining that one or more network nodes, of the plurality of network nodes, are processing traffic that includes the class of service; and
    generating the QoS model data structure based on determining that the one or more network nodes are processing the traffic that includes the class of service.

4. The method of claim 1, where creating the QoS provisioning data structure further includes:
    mapping another forwarding priority, of the one or more other forwarding priorities, to another packet loss probability that causes the network node to process the packets based on the other forwarding priority when the data rate of the packets is greater than the maximum data rate.

5. The method of claim 4, where the other packet loss probability is greater than the packet loss probability.

6. The method of claim 4, where the other forwarding priority is a lower priority than the forwarding priority.

7. The method of claim 1, where the QoS model data structure is based on a differentiated services protocol.

8. The method of claim 1, where creating the QoS provisioning data structure further includes:
    storing, as one or more code points in the QoS provisioning data structure, the one or more forwarding priorities in a manner that corresponds to the particular class of service.

9. The method of claim 1, where creating the QoS provisioning data structure further includes:
    storing, as one or more differentiated services code points (DSCPs) in the QoS provisioning data structure, the one or more forwarding priorities in a manner that corresponds to the particular class of service.

10. A system comprising:
    one or more processors to:
        receive a request to establish a quality of service (QoS) policy;
        generate a QoS model based on at least a portion of the QoS policy;
        identify a service level agreement (SLA) associated with a client device that is interconnected to a network node of a plurality of network nodes,
            the SLA identifying a profile that corresponds to one or more of:
                a packet loss probability, or
                a maximum data rate;
        create a QoS provisioning data structure based on the QoS model and the SLA,
            when creating the QoS provisioning data structure, the one or more processors are to:
                map a forwarding priority to the packet loss probability that causes the network node to process packets, associated with the client device, based on the forwarding priority when a data rate of the packets is less than the maximum data rate; and
        transmit, to the network node, the QoS provisioning data structure that permits the network node to process the packets in a manner that complies with the QoS model or with the SLA.

11. The system of claim 10, where the request includes information that corresponds to a desired QoS associated with traffic being transported by a network that includes the plurality of network nodes.

12. The system of claim 10,
    where the request includes information identifying particular nodes, of the plurality of network nodes, on which the QoS policy is to be established, and where the particular nodes include the network node and one or more other network nodes of the plurality of network nodes.

13. The system of claim 12, where, when generating the QoS model, the one or more processors are to:
monitor traffic being processed by the particular nodes,
identify characteristics associated with the traffic, and
create, based on the characteristics, the QoS model that is capable of enforcing the QoS policy.

14. The system of claim 10, where the QoS model identifies a class of service and a corresponding one or more forwarding priorities associated with traffic being transported by a network that includes the plurality of network nodes.

15. The system of claim 10,
where the SLA further identifies a particular class of service and corresponding one or more forwarding priorities for the packets,
where the profile is associated with the particular class of service, and
where the corresponding one or more forwarding priorities include the forwarding priority.

16. The system of claim 10,
where, when creating the QoS provisioning data structure, the one or more processors are to:
determine a mapping of information associated with the SLA to information associated with the QoS model, and
create the QoS provisioning data structure based on the mapping, and
where the mapping identifies one or more of a class of service associated with the profile, the packet loss probability, a forwarding priority marking, or a forwarding priority label.

17. A non-transitory computer-readable medium storing instructions, the instructions comprising:
one or more instructions that, when executed by at least one processor, cause the at least one processor to:
receive a request to establish a quality of service (QoS) policy that is to be applied to particular nodes of a plurality of nodes of a network;
generate a QoS model based on the request to establish the QoS policy;
identify a service level agreement (SLA) associated with a network node, of the particular nodes, that communicates with a client device;
identify particular information associated with the SLA,
the particular information, associated with the SLA, identifying a profile that corresponds to one or more of:
a packet loss probability, or
a maximum data rate;
create a QoS provisioning data structure based on the QoS model and the particular information associated with the SLA,
the one or more instructions to create the QoS provisioning data structure causing the at least one processor to:
map a forwarding priority to the packet loss probability that causes the network node to process packets, associated with the client device, based on the forwarding priority when a data rate of the packets is less than the maximum data rate; and
transmit, to the network node, the QoS provisioning data structure that permits the network node to process the packets in a manner that complies with the QoS model or with the SLA.

18. The non-transitory computer-readable medium of claim 17, where the one or more instructions to generate the QoS model comprise:
one or more instructions that, when executed by the at least one processor, cause the at least one processor to:
generate the QoS model based on information identified by a network administrator of the network.

19. The non-transitory computer-readable medium of claim 18, where the information identified by the network administrator includes one of:
packet loss probabilities,
a forward priority marking, or
data rate thresholds.

20. The non-transitory computer-readable medium of claim 17, where the particular information associated with the SLA further include instructions to drop particular packets when particular conditions are met.

* * * * *